United States Patent
Kawaguchi et al.

(10) Patent No.: US 6,913,685 B2
(45) Date of Patent: Jul. 5, 2005

(54) METHOD OF MODIFYING THE SURFACE OF PLASTIC SUBSTRATE

(75) Inventors: Masao Kawaguchi, Tokyo (JP); Tadao Tokushima, Kanagawa (JP); Yoshio Hirayama, Shizuoka (JP)

(73) Assignee: Unip Corporation Co., Ltd., Tokyo (JP)

( * ) Notice: Subject to any disclaimer, the term of this patent is extended or adjusted under 35 U.S.C. 154(b) by 409 days.

(21) Appl. No.: 10/172,909

(22) Filed: Jun. 18, 2002

(65) Prior Publication Data

US 2003/0230826 A1 Dec. 18, 2003

(51) Int. Cl.$^7$ .............................. C02F 1/461; B05D 5/00
(52) U.S. Cl. .................. 205/746; 134/42; 264/233; 264/341; 264/344; 427/322
(58) Field of Search ................ 205/746; 134/42; 264/233, 341, 344, 2.6; 427/322

(56) References Cited

U.S. PATENT DOCUMENTS

| | | | | |
|---|---|---|---|---|
| 3,908,680 A | * | 9/1975 | Krezanoski | 134/27 |
| 5,997,717 A | * | 12/1999 | Miyashita et al. | 205/466 |
| 6,048,466 A | | 4/2000 | Morizane et al. | |
| 6,375,809 B1 | * | 4/2002 | Kato et al. | 204/157.15 |
| 6,461,445 B1 | * | 10/2002 | Hirayama et al. | 134/36 |
| 6,531,047 B1 | * | 3/2003 | Kato et al. | 205/222 |

* cited by examiner

Primary Examiner—Arun S. Phasge
(74) Attorney, Agent, or Firm—Oblon, Spivak, McClelland, Maier & Neustadt, P.C.

(57) ABSTRACT

A plastic substrate is processed by a functional water obtained by electrolysis of water or functional water containing active oxygen or active hydrogen for a predetermined time period to selectively remove an alkali and/or halogen component in a surface layer of the plastic substrate to stabilize or remove oligomer in a resin matrix, whereby deterioration of resin and deterioration of properties of a recording medium caused by a remaining unreacted catalyst used for processing the plastic substrate surface or the like can be prevented and the adhesion strength and the durability of a recoding coating to be formed on the substrate are improved.

8 Claims, 4 Drawing Sheets

METHOD OF MODIFYING THE SURFACE OF PLASTIC SUBSTRATE

BACKGROUND OF THE INVENTION

1. Field of the Invention

The present invention relates to a method of modifying the surface of a plastic substrate used as a substrate for recording medium, an electric component, or a garniture.

2. Description of Background Art

In general, as a substrate of information recording medium such as a compact disk (CD), a videodisk, and an optical memory, plastic substrates made of a polycarbonate resin, a polymethyl-methacrylate (PMMA) resin, an acrylonitrile-butadiene-styrene (ABS) resin, a polyolefin resin or the like are widely used. The information recording medium is produced by forming a layer of a metal such as aluminum, tellurium, and rare earth metallic compound on a plastic substrate made of, for example a polycarbonate resin by a physical deposition method or by forming a layer of a metal by a chemical reaction such as a silver mirror reaction. Information is recorded and reproduced by irradiating a laser beam thereon and detecting a time variation of the intensity of a reflected light. Further, an optical recording medium for recording and reproducing information, which is formed by spin-coating a dye of changing its color by irradiation of light instead of adopting a metallic layer, is used.

In a case of a plastic substrate, because the adhesion strength and the durability of a metallic layer or an organic dye layer to be formed on the substrate are important factors, a method of modifying a surface of the plastic substrate or a method of cleaning the plastic substrate for enhancing the adhesion and the durability have been researched.

As the method of modifying the surface, a plasma treatment under a vacuum atmosphere is proposed. Although the plasma treatment is to modify a surface using ions, electrons, and radicals generated by electric discharge from nitrogen, oxygen, fluorine, argon, or the like in vacuo, electrodes and ions having high energy are apt to destroy the surface of the resin and to soften the low molecular structure, whereby the adhesion strength with the formed layer and the impact strength are decreased. Therefore, use of only radicals is required. Since high energy electrons, ions, and radicals of a discharge gas to be used are simultaneously generated in the discharge gas, a method of separating only the radicals has been sought. It has been proposed to separate radicals by a method of modifying a surface by increasing a distance for irradiating a light from a discharge area utilizing a difference of the lifetimes of electrodes and ions and the lifetime of radicals or by a method of applying an appropriate bias. However, these methods are scarcely used because the treatment is conducted under a vacuum atmosphere, which is not suitable for a practical application and requires a high running cost.

Therefore, ozonation by irradiating ultrasonic wave (UV) is used to contribute adhesion of a layer to be formed. However, it is impossible to selectively remove alkali and halogen components, a problem of corrosion resistance is not solved. Further, it is difficult to remove dust to be deposited.

Since a plastic substrate is easily charged when handling, it is cleaned by applying an ultrasonic wave or the like in a surfactant, an acid solution, or an alkaline solution. This method is effective for removing extraneous matters such as dust to some extent when a reproducing density is low. However, the object of the cleaning is not modification of a surface of resin. Therefore, there are many cases where alkaline and halogen components contained in a catalyst are not sufficiently removed, whereby there is a problem about durability of a metal and a recording dye layer. As for compact disks, the lifetime has been estimated at several decades. However, there are many cases where a light reflectance is deteriorated in about five years so as to make recording and reproducing difficult. Further, there is a case where a metallic film is deteriorated to be a transparent body made of oxide or hydroxide, whereby a missing bit may be generated and the reproducing sound quality may be deteriorated.

As for polycarbonate resins widely used for compact disks, the following mechanism seems to be a reason for deteriorating recording and reproducing characteristics. The polycarbonate resins are ordinarily prepared as products by copolymerizing bisphenol A by an ester interchange method or a phosgene method to make it a pellet resin of high polymer, providing with press molding and cleaning steps, adhering a metallic film. For the copolymerization, a compound containing a metal alcoholate of alkaline metal or alkaline earth metal of Na, K, Be, Mg and so on or containing an alkaline metal group such as Na salt of Na phenolate or dihydroxyallylalkane or the like is widely used as a catalyst. These alkaline catalysts deteriorate a resin when it is left in the resin. Therefore, after the reaction is completed these alkaline catalysts are neutralized by an acid having a high boiling point such as P-toluenesulfonic acid, organic halide, and dialkyl hydrosulfate. However, this neutralizing and removing process is not always perfect on an industrial aspect, wherein a minute unreacted catalyst may be left on a surface of resin to cause deterioration of characteristics of a recording medium.

As for PMMA methacrylate resin, a polyacrylic soda or a sodium sulfate is used in producing a pellet resin. A sodium resinate is used for an ABS resin. A halogen salt such as a metallocene catalyst is used for a polyolefin resin. Phenomenon similar to described above occur also in these cases.

When the recording will be switched to high-density recording using a blue laser beam, or when a resin substrate such as polycarbonate will be used as a substrate for digital recording medium of HDD, resolution of these problems will be strongly required for recording digital information. Although musical information and image information are recorded in digital signals, because the information itself has continuity, a missing bit can be corrected by an interleave interpolation method, whereby the resolution of these problems has not been required in past.

Because digital information used in an ordinary HDD has not continuity to cause bit errors, further reliability different from that in a conventional technique becomes required in recording mediums.

SUMMARY OF THE INVENTION

The present invention is provided to solve the above-mentioned problems inherent in the conventional technique and to provide a method of preventing deterioration of a resin and deterioration of characteristics of a recording medium caused by a residue of unreacted catalyst or the like in treating the surface of a plastic substrate and of improving the adhesion strength of a recording layer formed on the substrate and the durability of the recording layer.

According to the first aspect of the present invention, there is provided a method of modifying a surface of a plastic substrate comprising steps of:

processing the plastic substrate with a functional water obtained by electrolysis of water or a functional water containing active oxygen or active hydrogen for a predetermined time period for selectively removing an alkali and/or halogen component in a surface layer of the plastic substrate to enhance adhesion and durability of a film to be formed on the plastic substrate.

According to the second aspect of the present invention, there is provided a method of modifying the surface of the plastic substrate according to the first aspect of the invention, wherein the functional water is an active water having an oxidation reduction potential of 350 mV through 1,000 mV.

According to the third aspect of the present invention, there is provided a method of modifying the surface of the plastic substrate according to the second aspect of the invention, wherein the functional water is an anode ionized water having an oxidation reduction potential of 400 through 600 mV and pH of 3 through 7.

According to the fourth aspect of the present invention, there is provided a method of modifying the surface of the plastic substrate according to the first aspect of the invention, wherein the functional water is an active water having an oxidation reduction potential of −300 mV through −1,000 mV.

According to the fifth aspect of the present invention, there is provided a method of modifying the surface of the plastic substrate according to the fourth aspect of the invention, wherein the functional water is a cathode ionized water having an oxidation reduction potential of −300 through −600 mV and pH of 7 through 10.

According to the sixth aspect of the present invention, there is provided a method of modifying the surface of the plastic substrate according to the first aspect of the invention, wherein a processing time with the functional water is 3 through 60 minutes.

According to the seventh aspect of the present invention, there is provided a method of modifying the surface of the plastic substrate according to the second or third aspect of the invention, wherein a processing time with the functional water is 3 through 60 minutes.

According to the eighth aspect of the present invention, there is provided a method of modifying the surface of the plastic substrate according to the fourth or fifth aspect of the invention, wherein a processing time with the functional water is 3 through 60 minutes.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
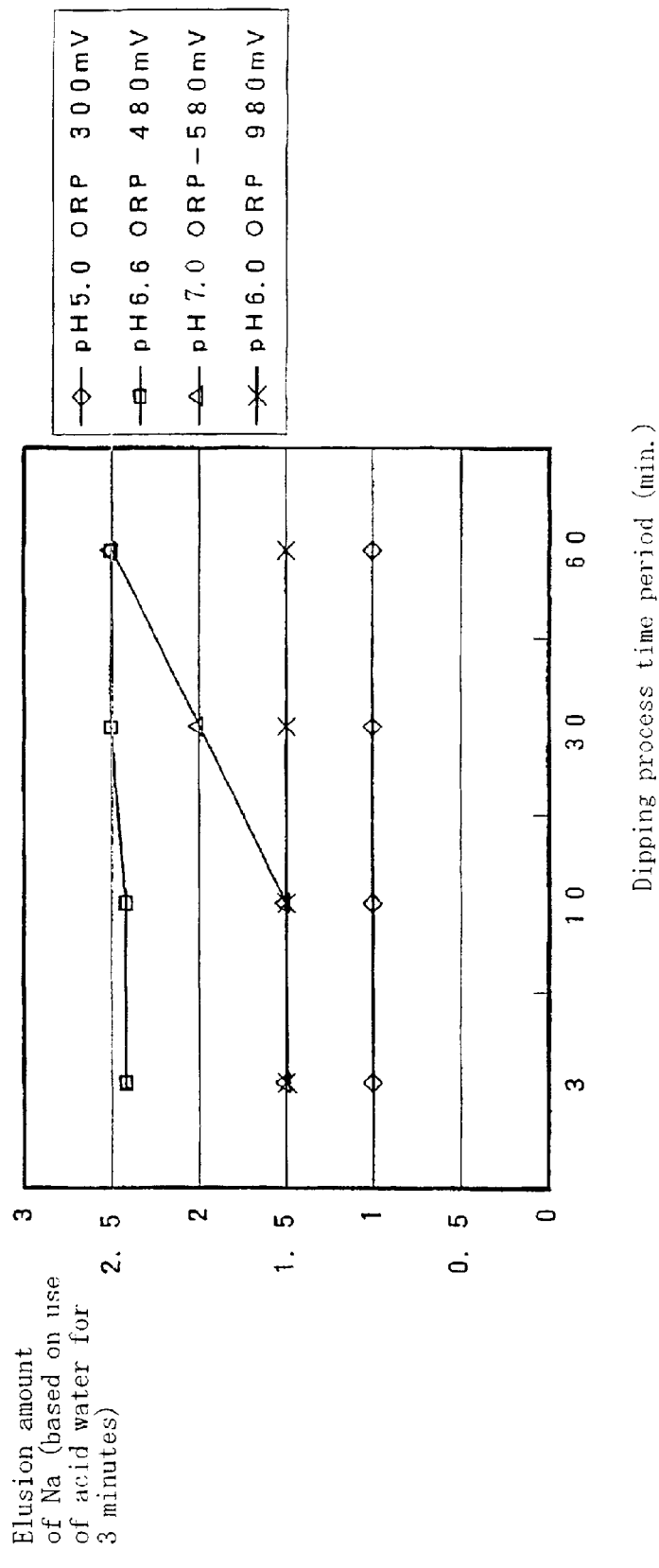
FIG. 1 is a graph for showing characteristics of dealkalization of a substrate processed according to an embodiment of the present invention and of a substrate processed by a conventional method for comparing these.

A detailed explanation will be given of preferred embodiments of the present invention in reference to FIGS. 1 through 4 as follows.

According to the present invention, a press-molded plastic substrate neutralized by an acid having a high boiling point and being subjected to a conventional cleaning step is processed by a functional water including radicals of active oxygen or active hydrogen to extract components of alkali and/or halogen remaining on the surface of the plastic substrate and to simultaneously stabilize unreacted monomers remaining on the surface using the active oxygens or the active hydrogens in the functional water, whereby the adhesion of a metallic coating formed on the plastic substrate in a later step is improved and aging of recording and reproducing property can be suppressed. The treatment using the functional water is a surface modifying process, which is conducted at a low industrial cost because this treatment does not destroy a resin matrix using high energy electrons and ions like plasma and many radicals that must be contained so as to be treated in a vacuum atmosphere, as is the case in other proposed treatments. In general, a resin molded piece is formed out of polymerized pellets by an injection molding. After the pellets are subjected to the treatment with the functional water, press molding or extrusion molding can be chosen. However, in this case, it is necessary to provide dealkalization and dehalogenation in the depths of the substrate, whereby a substantial processing time is required.

As the functional water, an electrolytic ionized water produced by electrolysis is most preferable. An electrolytic ionized water has a structure that water cluster molecules are decomposed by the electrolysis to minute sizes to facilitate infiltration inside the plastic. Especially, because an anode (ionized) water produced by electrolysis is shifted on the positive side, the cluster sizes of molecules are small and a solution is not electrically neutral, the anode water is apt to be substituted for Na in the plastic. Further, because the anode (ionized) water contains mild active oxygen radicals in it, the resin matrix is stabilized and an oligomer is prevented from invading on the surface of the substrate. Therefore, oligomer unreacted monomers are prevented from invading into the surface at a time of forming an Al coating in the process using the anode water, whereby deterioration of the surface roughness is avoidable and the reflectance of the metallic coating becomes excellent.

A major function of a cathode (ionized) water is to remove oligomers invading on the surface from the inside of the resin and extraneous matters on the surface by corroding the resin surface, whereby recording and reproducing properties are stabilized. Although the capability of eluting Na on the resin surface is slower than that of the anode water, the capability is faster than that of an ordinary acid or alkali.

This is supposed to depend on that the cathode water is apt to react with the matrix resin and hydrogen because the molecular size of the cathode water is small, the cathode water is in an electrically disequilibrium condition, and active hydrogen radicals are prevailing.

The molecular sizes of a functional water containing oxygen or hydrogen produced by electrolysis are supposed to be the same as those in ordinary pure water. However, a ratio of active oxygen radicals or active hydrogen radicals, representing activity of oxygen or hydrogen is larger than that of ordinary acid or ordinary alkali, whereby a reaction velocity with a resin matrix is high. Further, because the functional water can be made at a low cost in comparison with an anode (ionized) water and a cathode (ionized) water, an economic effect on an industrial aspect is prominent.

Oxidation reduction potential (ORP) of the anode (ionized) water and of an ozone water containing active oxygen is preferably 350 through 1,000 mV. Especially, a prominent effect is obtainable with ORP of 400 through 600 mV and pH of 3 through 7. It is not preferable to set ORP in a range exceeding 1,000 mV and pH of 2 or smaller because the oxidative power and the acidity are strong enough to break organic bonds on the resin surface so as to decrease the adhesion strength of the coating.

ORP of the functional water containing the cathode (ionized) water and of the functional water containing the active hydrogen is preferably −300 through −1,000 mV. A prominent effect is obtainable in ORP of −300 through −600 mV and pH of 7 through 10. It is not preferable to set ORP to be lower than −1,000 mV and pH to be more than 10 because the resin surface is corroded and the surface is roughened, and therefore an optical recording and reproducing signal is deteriorated. Optimum values of ORP and pH vary depending on methods of producing the functional water, molding conditions of the plastic, and cleaning conditions after the molding, whereby it is necessary to select the optimum values in reference of a type of resin for the substrate and a manufacturing process.

The processing time of the plastic substrate with the functional water such as the anode water is preferably 3 through 60 minutes. In Embodiment illustrated in FIG. 1, the elusion amount of Na from the substrate is saturated after the process for three minutes. However, the saturation varies depending on the type of the resin, the manufacturing conditions, and the shape of the resin.

Embodiment 1

A polycarbonate substrate used for a compact disk is processed with a predetermined functional water and an acid water as a Comparative Example under various processing conditions. The selected processing conditions are as shown in Table 1.

TABLE 1

| Type of functional water: | ① pH 6.6 | ORP 480 mV (anode water) |
| --- | --- | --- |
| | ② pH 6.7 | ORP 580 mV (anode water) |
| | ③ pH 7.0 | ORP-580 mV (cathode water) |
| | ④ pH 6.0 | ORP 980 mV (ozone water) |
| Comparative Example | ⑤ pH 5.0 | ORP 300 mV (acid water) |
| Processing time: | respectively for the above functional waters one minute, three minutes, five through sixty minutes | |

In the above Table 1, the functional water is pure water having a carbon acid gas melting in it, and the acid water is pure water having HCl melting in it. The following tests are conducted for thus processed polycarbonate substrates.

[Elusion Amount of Na]

A dealkalization characteristic from the polycarbonate substrate is measured by dipping the substrate into an ordinary acid water, an ozone water, a cathode water, and an anode water for a predetermined time period and measuring Na eluting into a solution by Inductivity Coupled Plasma-Mass Spectrometer (ICP-MS) manufactured by SEIKO Corporation.

FIG. 1 illustrates the characteristics of dealkalization showing the measured results. The measured values are standardized in reference of the acid water of pH of 5 and ORP of 300 mV. The elusion amount of Na from the substrate is saturated within about three minutes, wherein it is confirmed that the effect of the above-mentioned anode (ionized) water has the strongest effect. Because the above-mentioned cathode (ionized) water destroys the resin by a dipping treatment, the alkali elusion amount increases after a lapse of certain time period.

[Cr Coating Adhesion Strength]

Figure 2:
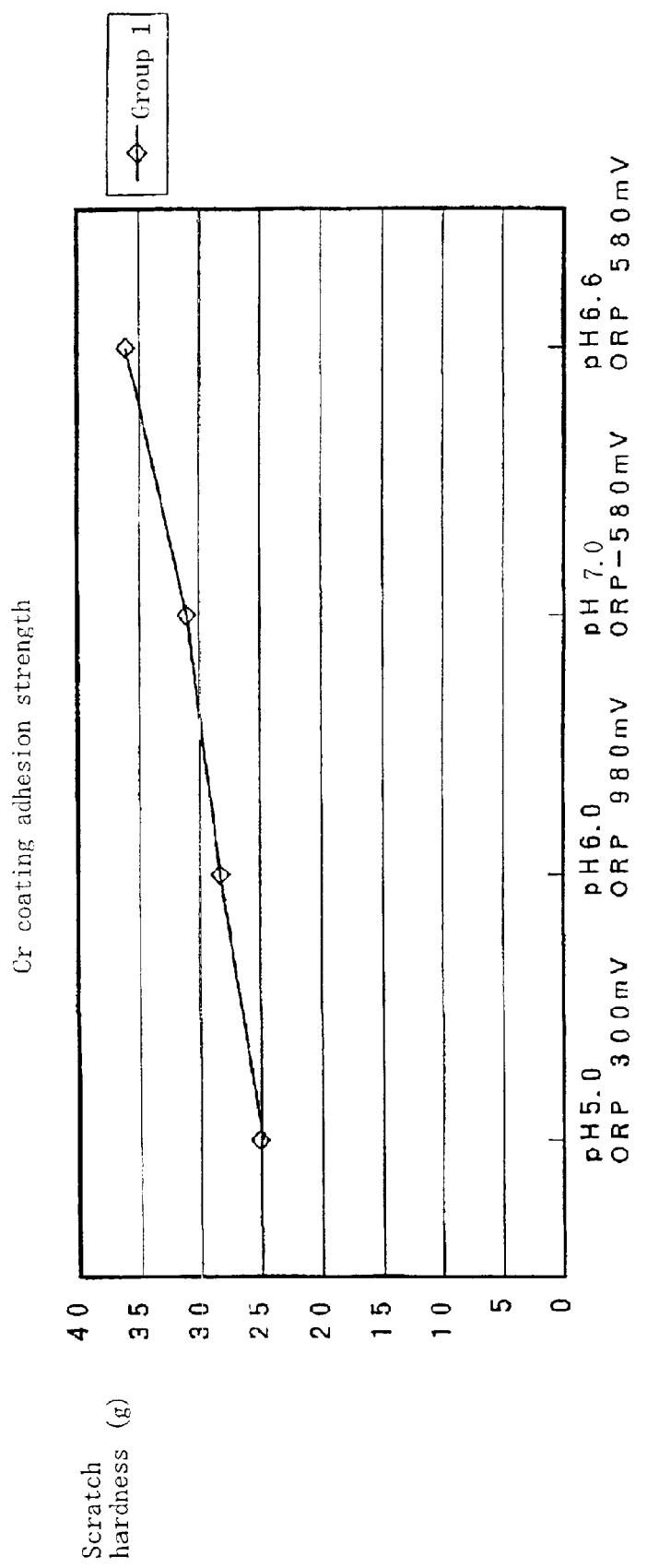
FIG. 2 is a graph for showing the adhesion strengths of a Cr coating on a substrate processed according to the embodiment of the present invention and on a substrate processed by the conventional method for comparing these.

Cr coating of a thickness of 400 Å is deposited on substrates after processing with predetermined functional waters by a sputtering method, and the adhesion of the coating is compared in reference of the scratch hardness. FIG. 2 is a graph showing the measured results of the scratch hardness after the substrate is processed with the various functional waters. The anode water has the best adhesion strength. The reason why the cathode water has the adhesion strength better than that of the ozone water is supposed to be an existence of an anchor effect caused by surface roughness on a part of the coating in addition to removal of Na salt and oligomer.

[Substrate Surface Roughness]

Figure 3:
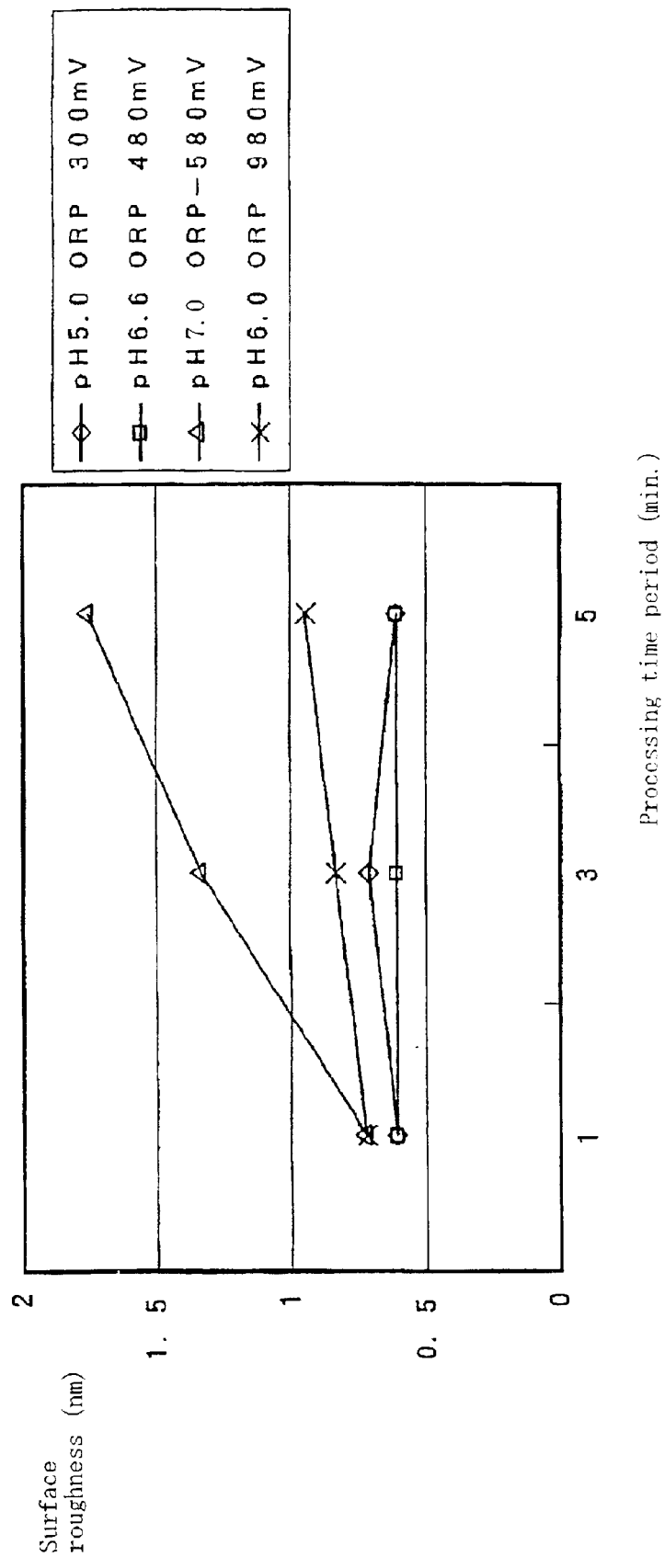
FIG. 3 is a graph for showing the surface roughnesses of a substrate processed according to the embodiment of the present invention and of a substrate processed by the conventional method for comparing these.

The surface roughnesses of substrates processed by the above-mentioned various functional waters are measured with Atomic Force Microscope (AFM). FIG. 3 is a graph showing the measured results. When the substrate is subjected to a treatment with the cathode water, the surface is roughened. However, a roughness of about 10 Å in roughness average (Ra) or root mean square (Rms) after a dipping process for five minutes is smaller than the wavelength of a laser beam to be used. Therefore, the roughness does not cause a substantial problem.

[Moisture Resistance Test]

Figure 4:
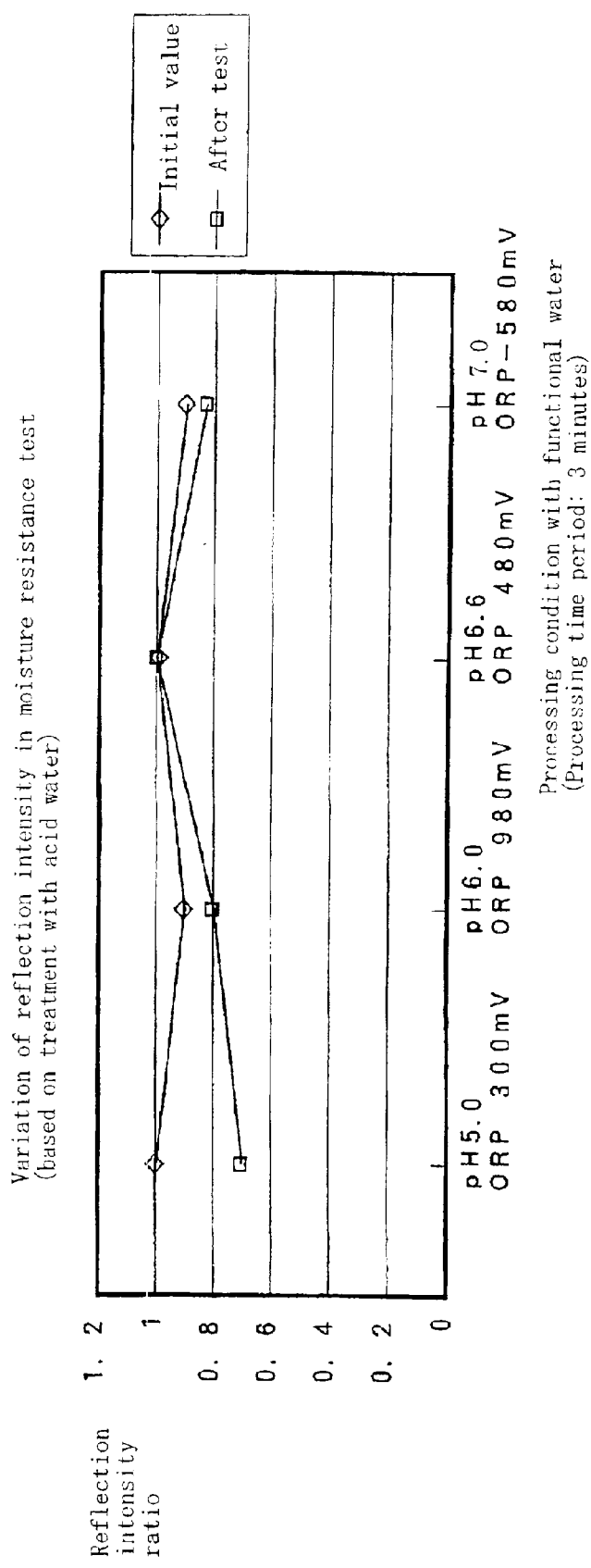
FIG. 4 is a graph for showing changes of reflection intensity of a substrate processed according to the embodiment of the present invention and of a substrate processed by the conventional method in a moisture resistance test for comparing these.

Disks formed by sputtering aluminum so that substrates, processed with the above-mentioned functional waters, have aluminum of a film thickness of 500 Å and spin coating an ordinary UV protection coating are maintained under 50° C. and 50% of relative humidity (RH) for 24 hours. Thereafter, the reflection intensity of the laser beam from the aluminum coating is measured at 10 points and averaged to measure deterioration of the reflected light. FIG. 4 is a graph showing the measured results. In FIG. 4, the rate of deterioration from a standardized initial value and an initial value is exhibited using percentage (%). The deterioration of the reflection intensity from the metallic coating subjected to the anode water was minimum.

As described above, an effect of modifying a plastic substrate surface by processing with a functional water according to the present invention is much better than the conventional cleaning method. Although a substrate surface is best modified by this treatment with a functional water for forming a metallic coating as a recording medium, a similar effect is obtainable in a substrate using an organic dye for a write-once type medium because the dye is easily damaged by alkali and halogen activated by irradiation of light.

Clearly, numerous modifications and variations of the present invention are possible in light of the above teachings. It is therefore to be understood that within the scope of the appended claims, the invention may be practiced otherwise than as specifically described herein.

What is claimed is:

1. A method of modifying a surface of a plastic substrate comprising steps of:

processing the plastic substrate with a functional water obtained by electrolysis of water or a functional water containing active oxygen or active hydrogen for a predetermined time period for selectively removing an alkali and/or halogen component in a surface layer of the plastic substrate; and forming a film on the plastic substrate, wherein the processing enhances adhesion and durability of the film formed on the plastic substrate.

2. The method of modifying the surface of the plastic substrate according to claim 1, wherein the functional water is an active water having an oxidation reduction potential of 350 mV through 1,000 mV.

3. The method of modifying the surface of the plastic substrate according to claim 2, wherein the functional water is an anode ionized water having an oxidation reduction potential of 400 through 600 mV and pH of 3 through 7.

4. The method of modifying the surface of the plastic substrate according to claim 2 or 3, wherein a processing time with the functional water is 3 through 60 minutes.

5. The method of modifying the surface of the plastic substrate according to claim 1, wherein the functional water is an active water having an oxidation reduction potential of −300 mV through −1,000 mV.

6. The method of modifying the surface of the plastic substrate according to claim 5, wherein the functional water is a cathode ionized water having an oxidation reduction potential of −300 through −600 mV arid pH of 7 through 10.

7. The method of modifying the surface of the plastic substrate according to claim 5 or 6, wherein a processing time with the functional water is 3 through 60 minutes.

8. The method of modifying the surface of the plastic substrate according to claim 1, wherein a processing time with the functional water is 3 through 60 minutes.

* * * * *